No. 780,589. PATENTED JAN. 24, 1905.
A. W. WIMMER.
DENTAL AUTOMATIC PLUGGER.
APPLICATION FILED FEB. 29, 1904.
2 SHEETS—SHEET 1.
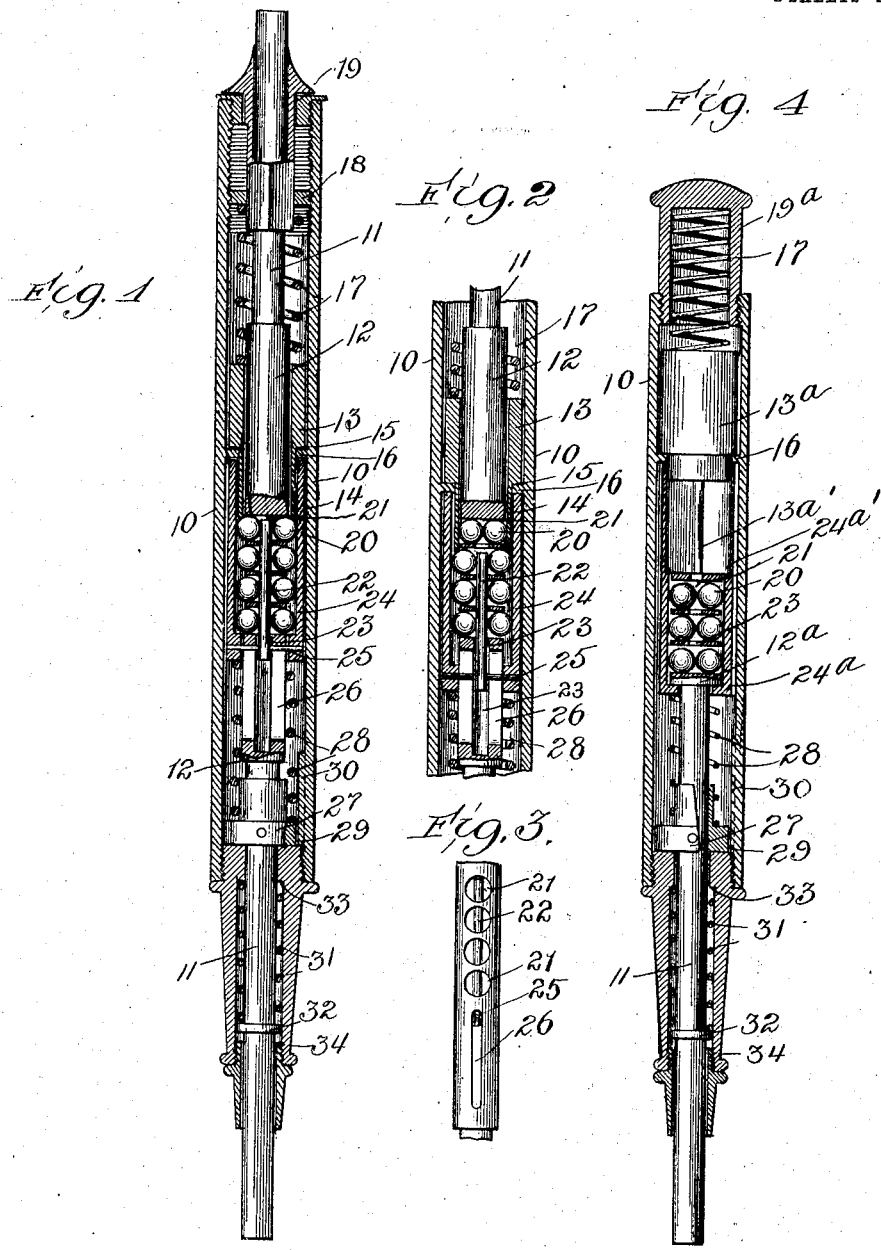
Witnesses:
Ray White
Harry B. White
Inventor
Alexander W. Wimmer
By Foree Bain Atty.

No. 780,589. PATENTED JAN. 24, 1905.
A. W. WIMMER.
DENTAL AUTOMATIC PLUGGER.
APPLICATION FILED FEB. 29, 1904.

2 SHEETS—SHEET 2.

Witnesses:
Ray White.
Harry R. S. White.

Inventor
Alexander W. Wimmer
By Foree Bain
Atty

No. 780,589. Patented January 24, 1905.

UNITED STATES PATENT OFFICE.

ALEXANDER W. WIMMER, OF CHICAGO, ILLINOIS.

DENTAL AUTOMATIC PLUGGER.

SPECIFICATION forming part of Letters Patent No. 780,589, dated January 24, 1905.

Application filed February 29, 1904. Serial No. 195,745.

*To all whom it may concern:*

Be it known that I, ALEXANDER W. WIMMER, of Chicago, in the county of Cook and State of Illinois, have invented certain new and useful Improvements in Dental Automatic Pluggers; and I hereby declare that the following is a full, clear, and exact description thereof, reference being had to the accompanying drawings, which form part of this specification.

My invention relates to dental automatic pluggers, and has for one of its salient objects to provide in a plugger means for effecting a releasable connection between the tool-carrying spindle and a spring-pressed hammer, such that the connecting means is moved to break the connection by the pressure tending to move the hammer relative to the spindle.

A further object of my invention is to provide a multiple-stroke plugger wherein the tension of the spring for the delivery of each blow is uniform and the blows are accordingly struck with equal force.

A further object of my invention is to provide a multiple-stroke plugger wherein the several blows of the hammer are so struck upon the spindle as to produce a minimum shearing effect or lateral strain thereon.

A further object of my invention is to provide a simple and efficient construction of single or multiple stroke plugger the parts whereof are so arranged that they may be accommodated in a casing of the same size as is usually employed for a single-stroke plugger.

With a view to attaining these and further objects, which will become apparent to those skilled in the art from the following description, my invention consists in the combinations of parts and features of construction hereinafter more fully described, and specified in the claims.

Figure 5:
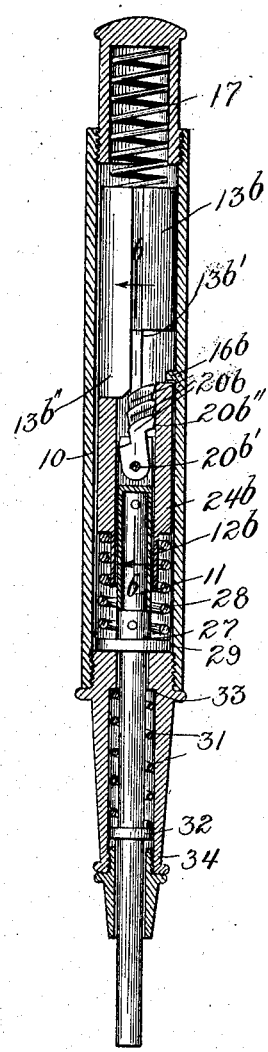
Figure 6:
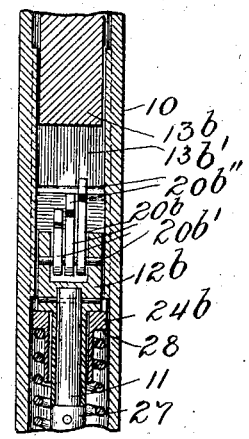
Figure 7:
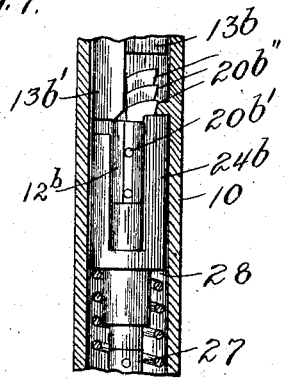

In the drawings, wherein I have illustrated three embodiments of my invention, Figure 1 is a central longitudinal section of one form of plugger. Fig. 2 is a sectional detail of the mechanism shown in Fig. 1, illustrating the position assumed by the parts after the first blow is struck. Fig. 3 is an elevation of a fragment of the spindle and associated devices. Fig. 4 is a central longitudinal section of a modification embodying my invention. Fig. 5 is a similar view of another modification. Fig. 6 is a section on line 6 6 of Fig. 5. Fig. 7 is an elevation of parts shown in Fig. 5, illustrating the position assumed by the parts after three blows have been struck, the casing being shown in section.

Throughout the drawings like numerals of reference refer always to like parts.

Referring now particularly to the embodiment of my invention shown in Fig. 1, 10 indicates a tubular casing member or handpiece adapted to be grasped in the hand of the operator and serving as the prime actuating device, from the movement whereof all of the operations of the plugger automatically follow. 11 indicates generally a tool-carrying-spindle structure which extends axially through the casing 10 and projects from both ends thereof. 12 indicates an enlargement formed upon the spindle 11 for purposes to be described. 13 indicates a hammer, in the present embodiment a tubular structure, surrounding the enlargement 12 of the spindle and capable of movement relative thereto and relative to the handpiece or casing 10. The lower portion of the hammer member 13 is reduced in exterior diameter, as at 14, forming an annular shoulder 15 intermediate the ends thereof. 16 indicates an annular abutment secured to the interior of the casing 10 and serving to limit the movement of the hammer 13 in one direction by engagement with the shoulder 15 thereof. 17 indicates a spring arranged to urge the hammer 13 toward the abutment 16, a direction which for convenience I will hereinafter term "downward." 18 indicates a spring-adjusting member threaded into the upper end of the casing 10, and 19 indicates the upper tip structure. This adjusting-tip is well known in the art and needs no further description. Means are provided for effecting a temporary connection between the hammer and the spindle to move said hammer, with the spindle, relative to the casing a predetermined distance against the tension of the spring 17, said connecting devices being movable to break the connection described by the pressure tending to move the hammer relative to the spindle. Means are also provided in operative association with the handpiece for restraining the connecting devices against movement to break the connection until after a predetermined excursion of the hammer relative to the casing has been accomplished and for moving the connecting devices back to connecting position after the completion of each cycle of operation. Further, the parts are so arranged that the connecting devices successively connect the hammer and spindle to lift the former with the latter and after a definite movement of said parts release the hammer for descent relative to the spindle until stopped by the next succeeding connecting device, which thus forms one of a series of movable impact parts. In the embodiment of the invention shown in Fig. 1 the connecting means comprises a series of pairs of balls 20 20, arranged in transverse passages or channels 21, bored or otherwise formed in the enlargement 12 of the spindle structure 11. The proportioning and arrangement of parts are such that when the balls are at their innermost limits of movement they will not interfere with the passage of the hollow hammer 13 over the enlargement of the spindle, while when moved to their outward limit of movement they intersect the path of movement of the hammer relative to the spindle. The balls, however, should never protrude more than half their diameter from the spindle, so that the hammer when engaging therewith will always exert its pressure upon them exteriorly to the vertical axis of the balls, so as to tend to force them inward. The means provided for moving the balls into position to afford a connection between the spindle and the hammer and for maintaining the balls in such position against their tendency to move inward in their channels under the pressure of the hammer comprises a stem 22, adapted to play in a bore 23, extending axially through a portion of the enlargement 12 of the spindle 11, and operatively associated with the handpiece 10 for movement therewith. The stem 22 is rigidly connected to a sleeve 24 by means of a pin 25. The sleeve 24 extends up above the uppermost pair of balls 20 into engagement with the abutment 16 of the casing 10. The parts are so proportioned that when in the normal position (indicated in Fig. 1) the portion of sleeve 24 projecting above the topmost pair of balls is equal in length to the range of movement of the casing or handpiece 10 relative to the spindle 11 in operating the device. As regards the ball arrangement, the sleeve 24 serves merely as a convenient retainer for holding the balls in assembling or separating the parts, and its only function in the operation of the device is to coact with the abutment 16 to afford a connection between the handpiece 10 and the stem 22 such that said stem is moved downward with the handpiece relative to the spindle. Any other suitable connection might be employed, however, and the sleeve omitted. 26 indicates a transverse guide-slot formed in the spindle to receive the cross-pin 25 and permit the latter to play vertically while holding it against rotation. 27 indicates a collar suitably secured to the spindle 11 and forming the lower abutment of a spring 28, which surrounds the spindle structure and bears at its upper end against the under surface of the sleeve 24 to hold the latter constantly in contact with the abutment 16 of the casing 10. The collar 27 is preferably provided with a groove 29, engaging a feather 30, formed on or secured to the inner surface of the casing 10 to prevent the spindle from rotating relative to said casing. The ordinary means are preferably provided for holding the spindle 11 at its downward limit of movement relative to the casing 10, such means comprising a spring 31, bearing at its lower end upon a collar 32, secured to the spindle, and at its upper end against a shoulder 33, formed interiorly in the tip structure 34. This tip structure may be of any convenient construction and its structure forms no part of the present invention. The operation of the device constructed as above described will be as follows: Normally the parts are in the position indicated in Fig. 1, the reduced end 14 of the hammer 13 resting upon the uppermost pair of balls 20, which are held at their outward limit of movement in contact with the sleeve 24 by the interposition of the pin 22 therebetween. In such position the uppermost balls 20 form a connection between the spindle structure and the hammer. If now the spindle be placed in contact with a stationary object and the handpiece or casing 10 be moved downwardly relative to the spindle, the hammer 13 is raised with said spindle so that its shoulder 15 leaves its position of contact with the abutment 16 of the casing, while the stem 22 is moved downward from between the uppermost balls 20 by reason of its connection with the handpiece 10 through the sleeve 24 and abutment 16. When the stem 22 passes from between the uppermost pair of balls 20, the latter being laterally unrestrained are moved inwardly by the pressure of the spring-urged hammer 13 to the position indicated in Fig. 2 out of the path of descent of said hammer, allowing the latter to strike a sharp clean blow upon the next subjacent pair of balls. As the handpiece 10 progresses farther downward relative to the structure 11 this operation is repeated with the second and third pairs of balls; but in the construction shown the limit of the excursion of the casing relative to the spindle is reached when the third pair of balls is passed, the lowest pair of balls in the construction shown serving simply as abutments to receive the last stroke of the hammer. Any fixed abutment might obviously be substituted for such lowest balls, the present construction being adapted merely for convenience of manufacture. Obviously during the movement heretofore described the springs 31 and 28 are compressed, so that as soon as the downward pressure upon the casing 10 is relieved by the operator said springs serve to restore the parts to their normal positions.

It will be apparent that as the spindle 11 extends through both ends of the casing the plugger may be used either with a straight or a hooked tool, as will be well understood by those skilled in the art.

In the construction illustrated in Fig. 4 the spindle 11 extends only through the lower end of the casing and stops at a point immediately above the uppermost pair of balls 20. The enlargement $12^a$ in this embodiment of the invention is, as in the first-described embodiment, of a diameter equal to or slightly less than the combined diameters of a pair of balls. The hammer $13^a$, however, is preferably the full diameter of the casing 10 and is provided with a downwardly-projecting stem or pin $13^{a\prime}$, which is adapted to play in a bore 23, formed centrally of the enlargement $12^a$, and tends to force its way between the balls 20 to press the same outwardly. The means for retaining the connecting-balls 20 in position to connect the spindle and hammer members in this modified embodiment comprises a sleeve $24^a$, loosely surrounding the spindle 11 and having an enlarged counterbore $24^{a\prime}$ at its upper end. The lower relatively contracted portion of the sleeve $24^a$ is of such diameter as to hold the balls 20 in their innermost position in contact with each other, so as to prevent the passage of the pin $13^{a\prime}$ of the hammer $13^a$ therepast, while the enlarged portion $24^{a\prime}$ of said sleeve is of such diameter as to permit the balls to move outwardly in their channels 21 to permit the passage of the pin $13^{a\prime}$ therebetween. At its upper end the sleeve $24^a$ bears against the flange 16, formed interiorly on the casing 10. The remaining elements of the device are similar to those described in connection with the embodiment shown in Fig. 1 except that the cap $19^a$ for the upper end of the casing is of the construction common in implements wherein the spindle has a single tool-carrying end. The other elements of the construction are indicated by the same numerals as like parts in Fig. 1. The operation of this device will be as follows: If the handpiece 10 be pressed downward relative to the spindle structure 11, it carries with it the sleeve $24^a$ by reason of the engagement of the upper end of said sleeve with the abutment 16 of the casing. The ball connecting devices being initially held in their innermost positions prevent the passage of the pin $13^{a\prime}$ of the hammer therebetween, and the hammer is consequently lifted against the tension of its spring 17 until the enlarged portion $24^{a\prime}$ of the sleeve $24^a$ comes opposite the uppermost pair of balls. Now the balls being laterally unrestrained at their outer sides yield under the pressure of the hammer and fly outward, permitting the pin $13^{a\prime}$ to pass therebetween and strike a sharp blow upon the next subjacent pair of balls. This operation is repeated three times, the last stroke being given by the lower face of the hammer upon the upper face of the enlargement $12^a$ of the spindle. The restoration of the device to initial position is accomplished in the embodiment heretofore described.

In th eembodiment of my invention shown in Figs. 5, 6, and 7 the spindle 11 carries a flat head member $12^b$ of suitable construction, which extends transversely through a sleeve member $24^b$, mounted to slide loosely relative to said spindle structure. $20^b$ $20^b$ indicate the connecting members, comprising a series of dogs of different vertical lengths pivoted on a common pin $20^{b\prime}$ and each provided with an offset head portion $20^{b\prime\prime\prime}$, having a curved or inclined upper surface. The hammer $13^b$ is cut away, as at $13^{b\prime}$, to leave a projecting end $13^{b\prime\prime\prime}$, the inner face whereof is preferably beveled, as shown. The parts are so disposed that the projection $13^{b\prime\prime\prime}$ of the hammer $13^b$ overlies the heads of the dogs $20^b$ when the latter are held in their innermost positions by the interposition of the sleeve structure $24^b$ between the head projections $20^{b\prime\prime}$ of said dogs and the casing 10. When now the casing 10 is forced down relative to the hammer, the sleeve $24^b$, abutting against the projection $16^b$ of the casing, is carried downward with said casing and passed below the level of the head $20^{b\prime\prime\prime}$ of the longest dog $20^b$. During such movement, however, the hammer $13^b$ is raised relative to the casing by its connection with the spindle through its bearing upon said longest dog $20^b$. When now the parts reach the position last described, the longest dog $20^b$, being released from the restraint of the sliding sleeve $24^b$, is forced outward by the contact of the beveled surface of the hammer with the curved upper face of the dog, and the hammer is permitted to descend and strike a sharp blow upon the next subjacent dog $20^b$, whose head $20^{b\prime\prime}$ is still held in innermost position by the sleeve $24^b$. This operation is repeated upon the lowermost dog, and a third blow is then struck upon the top surface of the head portion $12^b$, as indicated in Fig. 7.

While I have herein described in some detail several operative embodiments of my invention, I do not intend to be understood as limiting the scope of my invention to such embodiments, as the modifications are illustrated merely for the purpose of showing that variations may be readily made in the specific construction of devices without departing from the spirit and scope of my invention.

Having described my invention, what I claim, and desire to secure by Letters Patent of the United States, is—

1. In a dental automatic plugger, a spindle, a hammer, means for applying pressure to the hammer tending to produce relative movement between said hammer and the spindle and a device adapted and arranged to effect a temporary connection between the hammer and the spindle to prevent such relative movement of the parts and movable to break the connection by the pressure tending to produce relative movement between said hammer and spindle.

2. In a dental automatic plugger, a spindle, a hammer, means for urging the hammer in one direction relative to the spindle, and a device associated with said spindle for longitudinal movement therewith adapted and arranged to engage the hammer to lift the latter, said device being movable by the hammer out of its path of descent relative to the spindle.

3. In a dental automatic plugger, a spindle, a spring-actuated hammer, and a device carried by the spindle arranged to engage the hammer to lift the latter against the tension of its spring, said device being movable by the hammer out of its path of descent relative to the spindle.

4. In a dental automatic plugger, a spindle, a spring-actuated hammer, a device carried by the spindle movable into and out of operative engagement with the hammer, and means for maintaining said device in position for such engagement, said means being movable to release said connecting device to permit its movement out of engagement with the hammer.

5. In a dental automatic plugger, a spindle, a spring-actuated hammer, a device carried by the spindle, movable into and out of operative engagement with the hammer, means for moving said device into position for engagement with the hammer and positively maintaining it in said position, said means being movable to release said device for movement out of engagement with the hammer.

6. In a dental automatic plugger, a spindle, a spring-actuated hammer, a series of devices carried by one of said elements, adapted and arranged to successively effect temporary connection between the said elements, and successively movable to break the connection by the pressure tending to move the handle relative to the spindle.

7. In a dental automatic plugger, a spindle, a spring-actuated hammer, a series of devices carried by the spindle movable into and out of operative engagement, of the hammer, and means for maintaining said devices in position for such engagement, said means being movable to successively release said devices for movement out of engagement with the hammer.

8. In a dental automatic plugger, a spindle, a spring-actuated hammer, and a series of devices associated with said spindle for longitudinal movement therewith adapted and arranged to successively engage the hammer to lift the latter, said devices being movable by the hammer out of its path of descent relative to the spindle, and means for maintaining the said devices in position for such operative engagement with the hammer, said means being movable to successively release said devices to permit them to move out of engagement with the hammer.

9. In a dental automatic plugger, a handpiece, a spindle longitudinally movable relative to the casing, a spring-actuated hammer, a device associated with said spindle for longitudinal movement therewith adapted and arranged to engage the hammer to lift the same, and means for maintaining said device in position for operative engagement with the hammer, said means being movable with the handpiece to release said device.

10. In a dental automatic plugger, a handpiece, a spindle movable relative thereto, a hammer, laterally-movable devices carried by the spindle adapted to engage the hammer to lift the latter, and means for normally preventing such lateral movement of the devices associated with the handpiece for movement therewith.

11. In a dental automatic plugger, a handpiece, a spindle movable relative thereto, a hammer movable relative to the spindle in close proximity thereto, a series of laterally-movable balls carried by the spindle within the range of movement of the hammer, and means for normally holding said balls in the position of engagement with said hammer movable with the handpiece to successively release the balls and permit the latter to be moved from engagement with the hammer by the pressure of said hammer thereon.

12. In a dental automatic plugger, a handpiece having an abutment, a spindle movable relative to the handpiece, a series of laterally-movable devices carried by the spindle, a hammer movable relative to the spindle in a path intersected by the spindle-carried devices when in one position, and means for normally holding said devices in such position in the path of movement of the hammer comprising a sleeve interposed between said movable devices and the handpiece and disposed in contact with the abutment of the handpiece, whereby when said handpiece is moved longitudinally relative to the spindle, the spindle-carried devices are released for movement from the path of the hammer by the pressure of said hammer thereon.

13. In a dental automatic plugger, relatively movable spindle and hammer members, a spring for urging the hammer in one direction relative to the spindle, a plurality of separate, successively-arranged impact devices carried by one of said members, each impact device being arranged to connect said members to lift the hammer against the tension of its spring and movable to release the hammer for movement relative to the spindle until stopped by the next succeeding impact device, and means for controlling the operation of said impact devices.

14. In a dental automatic plugger, a spindle member, a hammer member, a handpiece, a spring for urging the hammer in one direction relative to the spindle disposed between said handpiece and the hammer, a plurality of separate impact parts carried by one of said hammer and spindle members at different longitudinal positions, each arranged to connect said members for movement together relative to the handpiece, said devices being successively movable out of connecting position to release the hammer for movement relative to the spindle into engagement with the succeeding impact device, and means associated with the handpiece for controlling the operation of said impact devices.

In testimony that I claim the foregoing as my own I affix my signature in presence of two witnesses.

ALEXANDER W. WIMMER.

In presence of—
   GEO. T. MAY, Jr.,
   MARY F. ALLEN.